United States Patent

Hale

[15] 3,694,892
[45] Oct. 3, 1972

[54] APPARATUS FOR AND THE METHOD OF MAKING SPIRAL SEAMED LAMINATED SHEET METAL PIPE

[72] Inventor: Reginald D. Hale, Vancouver, British Columbia, Canada

[73] Assignee: Spir-L-OK Industries Limited, Vancouver, British Columbia, Canada

[22] Filed: Oct. 26, 1970

[21] Appl. No.: 83,904

[52] U.S. Cl. .................29/429, 29/200 B, 29/505, 29/509, 72/49, 138/150, 138/154
[51] Int. Cl. ...........................................B23p 19/00
[58] Field of Search ............29/429, 505, 509, 200 B; 138/150, 154; 72/49

[56] References Cited

UNITED STATES PATENTS

| | | |
|---|---|---|
| 1,512,802 | 10/1924 | Robertson et al. .........138/150 |
| 2,862,469 | 12/1958 | Jensen ...........................72/49 |
| 3,263,321 | 8/1966 | Lombardi ....................29/429 |
| 3,474,514 | 10/1969 | Lombardi ..................29/200 B |
| 3,503,111 | 3/1970 | Janecek ....................29/200 B |

FOREIGN PATENTS OR APPLICATIONS 863,435    3/1961    Great Britain.............138/150

Primary Examiner—Charlie T. Moon
Attorney—Fetherstonhaugh & Co.

[57] ABSTRACT

Method of and apparatus for making spiral seamed laminated sheet metal pipe having a corrugated outer surface and a smooth inner surface. There is described a method which consists in denting the pipe in the region where seaming takes place and subsequently bringing the pipe to size and seaming between seaming rolls on a fixed mandrel, in this way to avoid large gaps at the inside of the seam and to maintain the pipe of substantially constant diameter.

8 Claims, 10 Drawing Figures

PATENTED OCT 3 1972 3,694,892

INVENTOR
REGINALD D. HALE
BY
Fetherstonhaugh & Co.
ATTORNEYS

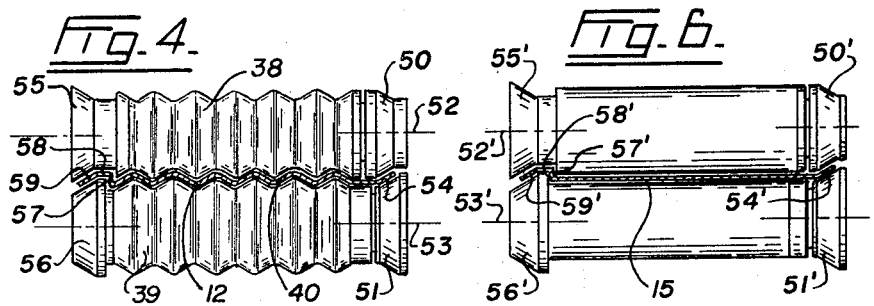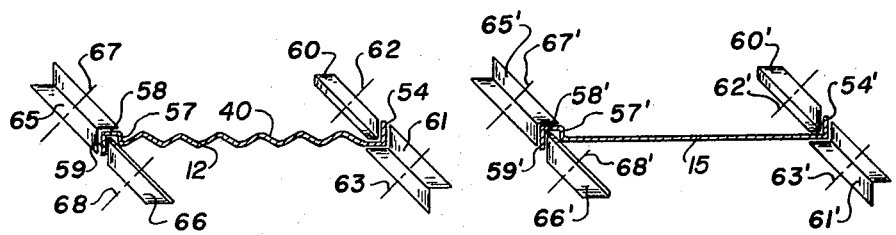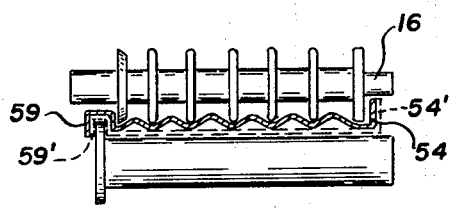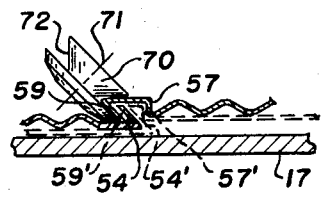

APPARATUS FOR AND THE METHOD OF MAKING SPIRAL SEAMED LAMINATED SHEET METAL PIPE

This invention is concerned with a method of, and apparatus for, making spiral seamed laminated sheet metal pipe of the kind having a corrugated outer lamina and an uncorrugated inner lamina. Pipes of this general kind, their applications and advantages are described in Canadian Pat. No. 835,728 issued July 15, 1969 to Jack P. Lombardi.

There is described in the Lombardi patent a method of and an apparatus for forming a locking seam in such pipe but it has been found that the pipe produced by following the method and using the apparatus has several drawbacks. One of the prime drawbacks is that there is formed in the pipe, at the seam between adjacent turns or convulutions of the strip, a large groove on the interior surface. As the main purpose in laminating corrugated and uncorrugated sheet is to provide a smooth interior surface for the pipe and at the same time to have the strength characteristics of corrugated pipe this is most serious. Another drawback is that it has been extremely difficult to maintain a constant diameter of the finished pipe and the pipe produced has been tapered.

The present invention seeks to obviate or alleviate these disadvantages.

The seams between adjacent strips of pipes of this kind are made by providing at one edge (hereinafter for convenience, although not restrictively, referred to as the front edge) of the strips which make up the pipe a hook by in effect rolling a groove in the edge of the strip, the groove being open to that side of the strip which will form the interior of the pipe, i.e., being opened towards the uncorrugated strip. At the other edge of the strip (the back edge) an upstanding flange is formed which projects towards that side of the strip which will be exterior of the pipe, i.e., projects towards the corrugated one of the strips. The arrangement is such that the flange of the strip will engage in the hook of a succeeding turn of the pipe and the seam will then be locked by rolling.

It is convenient to refer to the hook as being defined by an inwardly (relatively to the axis of the pipe) directed flange at the extreme front edge of the strip, a base, and a wall upstanding from the plane of the strip and spaced from the front edge of the strip, the base interconnecting the flange and wall.

The finished seam produced by such a hook and flange arrangement is one in which the hook of one strip or convolution is pressed around the back edge flange of the next strip or convolution and in section has the appearance of a loop almost completely embracing the flange and with the flange lying in a plane axially on the pipe.

According to one aspect of this invention the front and back edge configurations of the strips from which the pipe is made are formed as the strips are within their respective rolling mill frames (which in the case of the outer strip will comprise both corrugating and edge forming rolls, and in the case of the inner strip will comprise only edge forming rolls) and prior to the two strips being united, and the hooks are so formed that their inwardly directed flanges are of such length as to form after the seam is locked both the radially innermost (relatively to the finished pipe) part of the seam configuration and a radially extending part of the completed loop of the seam so that the base of the hook remains as the radially outermost part of the seam.

This is contrasted with the method in the Lombardi patent in which the base of the hook forms a radially extending part of the completed seam and the flange of the hook forms only an axially extending part of the seam. Effectively the Lombardi patent describes a system in which a radially upstanding seam is formed, i.e., a standing seam is formed and subsequently that seam is turned over to extend axially and to be locked. This means that extensive forming work must be done on the seam of the Lombardi patent whilst the strips are unsupported, i.e., after they have left their respective mill frames and that as the force is applied to turn over the seam to lie axially there is a tendency to move the individual turns of the strips axially along the mandrel upon which the pipe is being made. This results in deformation of the pipe and the formation of a large internal groove in the pipe. According to the present invention there is no axial movement at the seaming operation but only a radial pressing movement and hence this problem is eradicated.

According to another aspect of this invention the seaming is performed over a fixed mandrel within which is supported a seaming roll which co-operates with a corresponding seaming roll on the outside of the mandrel. It has been found that with this arrangement very much greater pressure can be exerted to lock the seam than is the case with the rotating mandrel of the prior patent for that pressure is exerted only against a short roll supporting shaft as opposed to against the longer shaft to support the rotating mandrel.

Preferably, and in using of heavy gauge sheet metals, necessarily the mandrel is recessed in the region at which the locking of the seam takes place so that the pipe tends to be "dented" at this region during the pressing of the seam. It has been discovered that one of the major drawbacks of the Lombardi system is that after pressing the seam the pipe tends to spring back to assume a greater diameter than that to which it is pressed. As this pressing in the Lombardi system is onto a rotating mandrel which dictates the internal diameter of the finished pipe this phenomenum results in the production of pipe of uneven diameter. With the arrangement according to this invention the seam is pressed into the recess of the fixed mandrel to such an extent that it springs back only to the diameter required of this finished pipe. Obviously this effect cannot be achieved using a rotating mandrel.

The invention is illustrated in the accompanying drawings of which,

FIGS. 4, 5, 6, 7, 8, 9 and 10 are schematic views showing the section of the strips forming the pipe at the stages indicated by correspondingly numbered section lines on FIG. 1, FIG. 10 being on a larger scale than the others.

Figure 1:
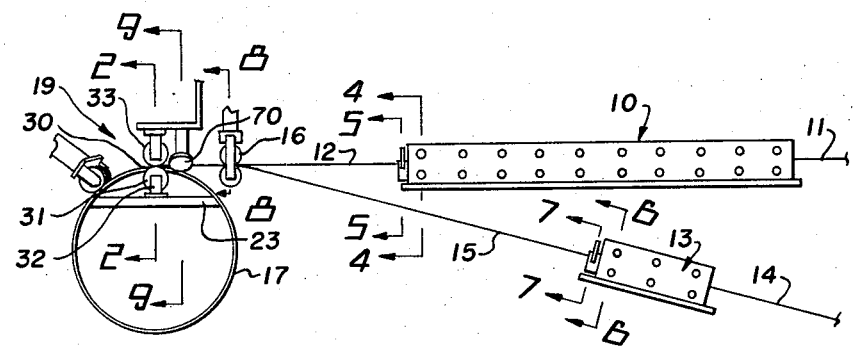
FIG. 1 is a reduced schematic side view of apparatus according to this invention.

The apparatus in FIG. 1 comprises a rolling mill frame indicated at 10 which includes both corrugating and edge forming rolls and through which plain strip indicated at 11 is passed to issue as corrugated and edge formed strip indicated at 12 and described in greater detail hereinafter.

Below the rolling mill frame 10 is a second rolling mill frame 13 through which plain strip 14 is passed to issue as edge formed strip 15 which again is described in detail hereinafter.

The formed strips 12 and 15 are united at a set of rolls 16 and passed through appropriate forming rolls to a mandrel 17 around which they are spirally wound and edge sealed, one turn to another by means of seal locking rolls indicated generally at 19 and described in detail hereinafter.

Figure 2:
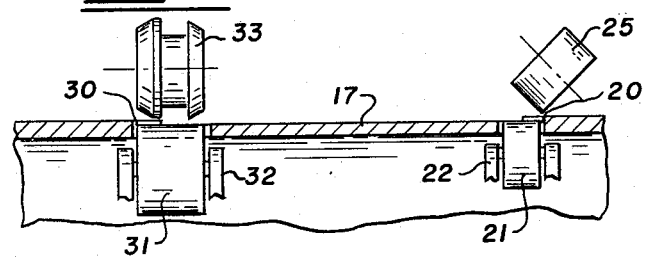
FIG. 2 is a section on the line 2—2 of FIG. 1.
Figure 3:
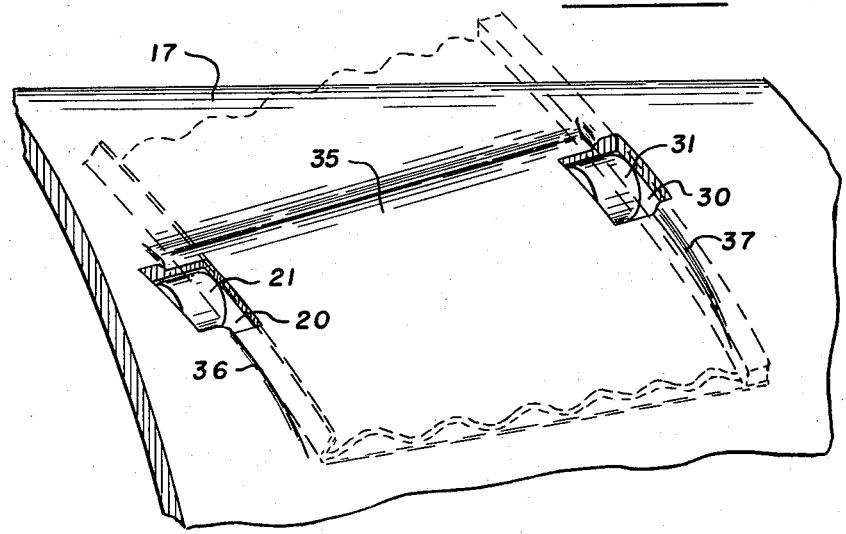
FIG. 3 is a perspective view of a part of the mandrel of the apparatus of FIG. 1, looking at the left side of said figure.

The mandrel of the apparatus is an important part of this invention and is illustrated in FIGS. 2 and 3. It is a generally cylindrical member having its outer diameter of substantially similar diameter to that required of the interior of the pipe to be formed. As viewed in FIG. 2 the pipe being formed progresses from right to left along the outer surface of the mandrel, while in FIG. 3 it is progressing from left to right.

A opening 20 is formed in the mandrel and a support roll 21 is rotatably mounted in bearings 22 supported upon a stout bracket 23 welded to the interior of the mandrel. The support roll 21 co-operates with forming roll 25 for a purpose described hereinafter.

A further opening 30 is formed in the surface of the mandrel and, with the opening 20, lies on a line generally normal to the edges of the strips being formed around the mandrel.

Secured within the mandrel and adjacent the opening 30 is a short seam locking roll 31 which is mounted in stout bearings 32 carried on a support, not shown extending across the interior of the mandrel. The seam-locking roll 31 co-operates with a corresponding roll 33 at the outside of the mandrel to lock the seam. In conventional fashion the roll 33 is mounted upon a hydraulic piston and cylinder unit, not shown, for exerting downward pressure.

As can be seen more particularly in FIG. 3 the surface of the mandrel from a little ahead of the openings 20 and 30, considered in the direction of progression of the strips around the mandrel, to a point spaced behind those openings is recessed as at 35, the recess being deepest ahead of the openings and tapering progressively in the direction of progression of the strip around the mandrel to merge smoothly with the unrecessed sections of the mandrel surface. It will be noted that the circumferentially extending edges 36 and 37 of the recess follow the helix around the mandrel which is followed by the edges of the strips forming the pipe and pass over a mid point of the rolls 31 and 21.

The sequence of forming is shown in FIGS. 4, 5, 6, 7, 8, 9 and 10.

Referring to FIG. 4 the corrugating rolls are largely conventional for the strip 11 which is shown in full lines. At the right side of the strip in FIG. 4, i.e., the back edge of the strip, there are complementary rolls 50 and 51 mounted on centerlines 52, 53 respectively which turn flange 54 to about 45° from the plane of the strip.

At the left side centerlines FIG. 4, i.e., at the front edge of the strip, there are complementary edge forming rolls 55 and 56 which are also rotatable upon centerlings 52 and 53 and which turn a wall 57 of what will be the hook of that strip vertically out of the plane of the strip, turn the base 58 and partially turn the flange 59 at the extreme front edge of the strip. Corrugating rolls 38 and 39 between rolls 50, 55 and 51, 56, respectively, form corrugations 40 in the strip between flange 54 and wall 57.

In FIG. 5 which is a succeeding stage of the forming operation there are provided complementary rolls 60 and 61 rotatable about inclined axes 62 and 63 respectively and which complete the turning of back edge flange 54 to a position normal to the plane of the strip.

At the front edge of the strip there are complementary edge forming rolls 65 and 66 rotatable upon inclined axes 67 and 68 respectively which complete the turning of the flange 59 to be normal to the plane of the strip and vertically down from that plane.

It is to be appreciated that for lighter gauge strip it may be possible to use but a single pair of edge forming rolls for each edge of the strip to obtain the section shown in FIG. 5.

It will be noted that the flange 59 is considerably longer than wall 57, this for a purpose described in detail hereinafter.

FIGS. 6 and 7 show the rolling of the inner strip 15. The rolling within the mill frame 13 of the inner strip is substantially similar to that of the rolling of the strip 11 within mill frame 10 with the exception that there are no corrugating rolls. For this reason like parts are identified by numerals but which are allotted indices. Rolls 60' and 61' form flange 54' on the back edge of strip 15, and rolls 65' and 66' on the front edge of said strip form the hook made up of wall 57', base 58' and flange 59'.

From the mill frames 10 and 13 the formed strips 12 and 15 are passed to rolls 16 at which these two strips are matched and united to form a laminate as illustrated in FIG. 8. The two strips are matched by bringing flanges 54 and 54' together at one edge and their respective hooks are brought together at the opposite edge. In FIGS. 8, 9 and 10, the corrugated strip 12 is shown in full line and the uncorrugated strip 15 is shown in dotted line for the sake of clarity.

From the rolls 16 the laminate is driven past a forming roll 70 rotatable about an inclined axis 71. This roll is immediately ahead of rolls 31, 33 of the mandrel.

The roll 70 has a generally V-shaped forming configuration 72 which presses the flange 59 of the hook at the front edge of the laminate beneath the already formed reentrant back edge flange 54 of the strip. The flanges 54 and 54' at the back edge of the strip are turned over by roll 25 before said flanges reach roll 70, said roll being behind roll 33 in FIGS. 2 and 10. However, no sealing action has taken place as flanges 54 and 54' pass roll 25. The united strips pass from roll 25 around the mandrel to roll 70 and then to rolls 31, 33.

From the roll 70 the strip proceeds to the rolls 31 and 33 of which roll 33 has a circumferential forming groove 33'. These two rolls securely lock the seal and, as they act in depression 35 within the mandrel surface they tend to dent the pipe being formed at this region and the pipe regains the finished diameter required of it as it leaves the rolls 31, 33 and progresses to the normal outer surface of the mandrel and along the mandrel.

It is to be noted that it is the hook flange 59 which is folded around and beneath the back edge flange 54 so that the flange 59 forms the radial section indicated in FIG. 10 by numeral 90 of the seal and also the axial innermost section 91 of the seal. The base 58 of the hook forms only the radially outermost part of the seal.

It will be appreciated that with the arrangement illustrated in the drawings during the actual formation of the seal and its locking there is no force axial to the finished pipe or transverse to the strip exerted at the seal whilst the remainder of the strip is unsupported. This characteristic and the characteristic of using a fixed mandrel with which one is able to "dent" the pipe in the region at which sealing is affected, enables one to produce pipe of substantially constant diameter and with a groove at the interior surface of the finished pipe which is minimal and very much less than that which is possible by the use of the apparatus and the following of the method illustrated in the Lombardi patent.

I claim:

1. A method of producing spirally seamed laminated sheet metal pipe having an outer lamina of corrugated strip and an inner lamina of uncorrugated strip, which comprises rolling front and back edge seam configurations in said strips, subsequently matching and laminating the strips to form a laminate having a corrugated and an uncorrugated side, then laying the laminate spirally onto a fixed cylindrical mandrel so that the back edge configuration of one convolution thus lain on the mandrel is located within the front edge configuration of a succeeding convolution, and radially pressing the thus located configurations between opposed seaming rolls, one roll located within the mandrel and one roll located outside the mandrel, thus to form a locked seam.

2. A method as claimed in claim 1 in which the mandrel is recessed in the region of said seaming rolls wherein the laminate is dented in that region by the seaming rolls and subsequently restored to the same diameter as the mandrel.

3. A method as claimed in claim 1 in which the front edge seam configuration is rolled to the form of a groove defined by a flange upstanding from the uncorrugated side of the laminate and at the extreme edge of the strips, a base in a plane generally parallel to the plane of the strips, and a wall upstanding from the corrugated side of the laminate, the base interconnecting the wall and the flange; the back edge seam configuration is rolled to form a flange upstanding from the corrugated side of the laminate, the laminate is lain on the mandrel so that the back edge flange is located within the front edge groove and the seam is locked in a single operation by seaming rolls rotatable about axes normal to the seam.

4. A method as claimed in claim 1 in which the front edge seam configuration is rolled to the form of a groove defined by a flange upstanding from the uncorrugated side of the laminate and at the extreme edge of the strips, a base in a plane generally parallel to the plane of the strips, and a wall upstanding from the corrugated side of the laminate, the base interconnecting the wall and the flange; the back edge seam configuration is rolled to form a flange upstanding from the corrugated side of the laminate, the laminate is lain on the mandrel so that the back edge flange is located within the front edge groove and the seam is locked in a single operation by seaming rolls rotatable about axes normal to the seam, the base of the groove forming the radially outermost portion of the locked seam.

5. Apparatus for making spirally seamed laminated sheet metal pipe having an outer lamina of corrugated strip and an inner lamina of uncorrugated strip, which comprises individual rolling mills for each of said corrugated and uncorrugated strips, said mills including front and rear edge forming rolls of matching sections for the two strips, means matching and uniting the strips thus formed into a laminate, a fixed cylindrical mandrel, and means for laying the laminate spirally on the mandrel with the back edge configuration of one convolution of convolutions thus lain on the mandrel, within the front edge configuration of a succeeding convolution, two cooperating seaming rolls one located within the mandrel and engaging the combined seam edge configurations through an opening in that mandrel and the other located outside the mandrel and engaging the combined seam edge configurations on the opposite side to said first seaming roll.

6. Apparatus as claimed in claim 5 in which the mandrel is recessed in the region of said seaming rolls.

7. Apparatus as claimed in claim 6 in which said recess extends partially around the outer surface of the mandrel in the direction in which the laminate is lain upon that mandrel and is progressively less shallow in the direction of progression of the laminate upon the mandrel.

8. Apparatus as claimed in claim 5, in which the seaming roll outside the mandrel is formed with a circumferential groove within which the material of the seam is pressed.

* * * * *